United States Patent
Takita et al.

(10) Patent No.: US 9,563,791 B2
(45) Date of Patent: Feb. 7, 2017

(54) CARD READER

(71) Applicant: NIDEC SANKYO CORPORATION, Suwa-gun, Nagano (JP)

(72) Inventors: Yukihiko Takita, Nagano (JP); Shinya Miyazawa, Nagano (JP); Jo Tanaka, Nagano (JP); Yohei Shimizu, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 14/891,135

(22) PCT Filed: Jan. 6, 2015

(86) PCT No.: PCT/JP2015/050114
§ 371 (c)(1),
(2) Date: Nov. 13, 2015

(87) PCT Pub. No.: WO2015/105090
PCT Pub. Date: Jul. 16, 2015

(65) Prior Publication Data
US 2016/0314326 A1    Oct. 27, 2016

(30) Foreign Application Priority Data
Jan. 7, 2014  (JP) ................................. 2014-001160

(51) Int. Cl.
G06K 7/08     (2006.01)
G06K 13/06    (2006.01)

(52) U.S. Cl.
CPC ............... *G06K 7/084* (2013.01); *G06K 13/06* (2013.01)

(58) Field of Classification Search
CPC ................................ G06K 7/084; G06K 13/06
See application file for complete search history.

(56) References Cited

FOREIGN PATENT DOCUMENTS

| JP | 2004227371 A | 8/2004 |
|----|--------------|--------|
| JP | 2013164675 A | 8/2013 |
| JP | 2014099094 A | 5/2014 |

OTHER PUBLICATIONS

International Search Report corresponding to Application No. PCT/JP2015/050114; Date of Mailing: Apr. 7, 2015, with English translation.

*Primary Examiner* — Kristy A Haupt
(74) *Attorney, Agent, or Firm* — Cantor Colburn LLP (57) ABSTRACT

A card reader for use with a card may include a card insertion part formed with an insertion port into which the card is inserted; and a magnetic head provided in the card insertion part and structured to contact with the card. A magnetic gap in a straight shape may be formed at a tip end of the magnetic head where the card is to be contacted. When a forming direction of the magnetic gap formed in the straight shape is a gap direction, the gap direction may be inclined with respect to a first direction perpendicular to an inserting direction of the card when viewed in a thickness direction of the card inserted into the insertion port.

8 Claims, 11 Drawing Sheets

|  | 0° | 5° | 10° | 15° | 20° | 25° | 30° | 35° | 40° | 45° | 50° | 55° | 60° | 65° | 70° | 75° | 80° | 85° | 90° |
|---|---|---|---|---|---|---|---|---|---|---|---|---|---|---|---|---|---|---|---|
| Condition 1 | 3 | 10 | 9 | 10 | 10 | 10 | 8 | 8 | 7 | 7 | 6 | 6 | 6 | 8 | 7 | 6 | 3 | 3 | 4 |
| Condition 2 | 2 | 1 | 2 | 8 | 8 | 10 | 9 | 8 | 10 | 7 | 8 | 7 | 7 | 6 | 3 | 3 | 1 | 0 | 2 |
| Condition 3 | 4 | 3 | 6 | 22 | 22 | 21 | 22 | 20 | 18 | 18 | 17 | 14 | 11 | 11 | 7 | 9 | 8 | 10 | 17 |
| Condition 4 | 2 | 0 | 3 | 5 | 7 | 0 | 0 | 0 | 14 | 12 | 9 | 4 | 12 | 7 | 3 | 3 | 2 | 1 | 0 |

CARD READER

CROSS REFERENCE TO RELATED APPLICATIONS

This is the U.S. national stage of application No. PCT/JP2015/050114, filed on Jan. 6, 2015. Priority under 35 U.S.C. §119(a) and 35 U.S.C. §365(B) is claimed from Japanese Applications No. 2014-001160, filed Jan. 7, 2014; the disclosures of which are incorporated herein by reference.

FIELD OF THE INVENTION

At least an embodiment of the present invention relates to a card reader structured to perform reading of magnetic data recorded in a card.

BACKGROUND

Conventionally, a card reader has been known in which a card formed in a substantially rectangular shape is taken into in its short side direction to perform reading of magnetic data recorded in the card (see, for example, Patent Literature 1). The card reader described in Patent Literature 1 includes a card conveying passage where a card is conveyed, a card conveying mechanism structured to convey the card along the card conveying passage, a magnetic head for reading magnetic data recorded in a magnetic stripe of the card, and a head moving mechanism structured to move the magnetic head in a direction perpendicular to a conveying direction of the card. The magnetic head is disposed so as to contact with a card from one side relative to the card conveying passage. Further, a card for being processed in the card reader described in Patent Literature 1 is a card which is specified in the international standard or JIS standard and a magnetic stripe is formed on a rear face of the card. The magnetic stripe is formed in a strip shape parallel to a longitudinal direction of the card.

PATENT LITERATURE

[PTL 1] Japanese Patent Laid-Open No. 2013-164675

In the card reader described in Patent Literature 1, when a card is taken into the card reader in a state that the directions of its front and rear faces are reversed, magnetic data cannot be read by the magnetic head. Further, commonly, even when a card in which magnetic data are not recorded is taken into the card reader, magnetic data cannot be read by the magnetic head. Therefore, in the card reader described in Patent Literature 1, it is preferable to detect that a card in which magnetic data are recorded has been inserted into the card reader in a state that the directions of its front and rear faces are correct.

SUMMARY

In view of the problem described above, at least an embodiment of the present invention provides a card reader in which a card in a substantially rectangular shape is taken into in its short side direction to be performed with reading of magnetic data recorded in a magnetic stripe of the card and which is capable of detecting that a card on which magnetic data are recorded has been inserted in a state that the directions of its front and rear faces are correct.

In order to attain the above, at least an embodiment of the present invention provides a card reader for use with a card in a substantially rectangular shape which is taken into in its short side direction to be performed with reading of magnetic data recorded in a magnetic stripe of the card. The card reader includes a card insertion part which is formed with an insertion port into which the card is inserted, and a magnetic head which is provided in the card insertion part and structured to contact with the card. A magnetic gap in a straight shape is formed at a tip end of the magnetic head where the card is to be contacted and the magnetic stripe is formed so that its longitudinal direction and a longitudinal direction of the card are coincided with each other and the magnetic data are recorded in the magnetic stripe so as to be arranged in the longitudinal direction of the card. When a forming direction of the magnetic gap formed in the straight shape is referred to as a gap direction, the gap direction is inclined with respect to a first direction perpendicular to an inserting direction of the card when viewed in a thickness direction of the card inserted into the insertion port.

In the card reader in accordance with at least an embodiment of the present invention, the card insertion part includes a magnetic head structured to contact with a card. Therefore, according to at least an embodiment of the present invention, based on a detected result by the magnetic head, it can be detected whether a card has been inserted into the insertion port in a state a face of a card on which magnetic stripe is formed is directed to an upper side or a lower side. In other words, in at least an embodiment of the present invention, it can be detected whether a card has been inserted in a state that the directions of its front and rear faces are correct or not based on a detected result by the magnetic head.

In at least an embodiment of the present invention, magnetic data are recorded in a magnetic stripe so as to be arranged in a longitudinal direction of a card and the card formed in a substantially rectangular shape is taken into in its short side direction and thus the first direction perpendicular to an inserting direction of the card and an arrangement direction of the magnetic data are coincided with each other. In this case, when viewed in a thickness direction of the card, in a case that the gap direction which is a forming direction of the gap formed at a tip end of the magnetic head and the first direction are parallel to each other, even if magnetic data are recorded in a magnetic stripe, magnetization reversals in the magnetic data cannot be detected by the magnetic head. However, in at least an embodiment of the present invention, when viewed in a thickness direction of the card, the gap direction is inclined with respect to the first direction and thus, in a case that magnetic data are recorded in a magnetic stripe, magnetization reversals in the magnetic data can be detected by the magnetic head. In other words, according to at least an embodiment of the present invention, it can be detected that a card on which magnetic data are recorded has been inserted on the basis of a detected result by the magnetic head.

In at least an embodiment of the present invention, the card reader includes a control section into which an output signal of the magnetic head is inputted, and the control section determines that the magnetic data are recorded in the magnetic stripe, for example, when the number of peak values exceeding a predetermined threshold value is a predetermined number or more. The peak values are values of peaks included in an output signal of the magnetic head when the card is passed through the magnetic head.

In this case, it is preferable that the control section determines that the magnetic data are recorded in the magnetic stripe when the number of the peak values exceeding the threshold value is "n" or more, wherein the "n" is an integer of 3 or more. According to examinations of the present inventors, they have found that, in a case that the magnetic head is contacted with a card, even if magnetic data are not recorded in a magnetic stripe, a peak value of an output signal of the magnetic head may exceed a predetermined threshold value when the magnetic head starts to contact with the magnetic stripe and when the contact of the magnetic head with the magnetic stripe is ended. In other words, the present inventors have found that, even if magnetic data are not recorded in a magnetic stripe, in a case that the magnetic head is contacted with a card, there may be occurred that the peak value exceeds the threshold value two times. Therefore, when the control section is structured to determine that magnetic data are recorded in a magnetic stripe in a case that the number of peak values exceeding a threshold value is "n" or more ("n" is an integer of 3 or more), the control section is capable of appropriately determining that magnetic data are recorded in the magnetic stripe. In the present specification, the phrase "peak value exceeds a threshold value" includes a case that a peak value exceeds a threshold value that is set on the plus side and a case that a peak value becomes lower than a threshold value that is set on the minus side.

In at least an embodiment of the present invention, it is preferable that, when viewed in a thickness direction of a card and, when an inclination angle of the gap direction is 0° in a case that the first direction and the gap direction are parallel to each other and the inclination angle of the gap direction is 90° in a case that the first direction and the gap direction are perpendicular to each other, the inclination angle of the gap direction when viewed in the thickness direction of the card is set in a range of 10° to 75°. According to examinations of the present inventors, they have found that, in a case that a magnetic head is contacted with a magnetic stripe in which magnetic data of all "0" whose recording density is 75 bpi (bit per inch) are recorded and in which magnetic data of all "0" whose recording density is 210 bpi are recorded, the number of peak values exceeding a threshold value becomes larger than at least three when the inclination angle of the gap direction is set in a range of 10° to 75°. Therefore, according to this structure, it can be appropriately determined that magnetic data are recorded in a card specified in the international standard or JIS standard.

In at least an embodiment of the present invention, it is preferable that the inclination angle of the gap direction is set in a range of 15° to 25° when viewed in the thickness direction of the card. In this case, the inclination angle of the gap direction is, for example, set to 15° when viewed in the thickness direction of the card. According to examinations of the present inventors, they have found that, in a case that a magnetic head is contacted with a magnetic stripe in which magnetic data of all "0" whose recording density is 75 bpi are recorded and in which magnetic data of all "0" whose recording density is 210 bpi are recorded, when the inclination angle of the gap direction is set in a range of 15° to 25°, the number of peak values exceeding the threshold value is increased and occurrence of a scratch on the magnetic stripe due to inclination of the magnetic head can be suppressed. Therefore, according to this structure, it can be appropriately determined that magnetic data are recorded in a card specified in the international standard or JIS standard while suppressing occurrence of a scratch on the magnetic stripe.

In at least an embodiment of the present invention, it is preferable that the magnetic head is disposed on one end side in the first direction of the card insertion part. In a card specified in the international standard or JIS standard, one end side of a magnetic stripe is recorded with a preamble comprised of magnetic data of all "0" and the other end side of the magnetic stripe is recorded with a postamble comprised of magnetic data of all "0". Therefore, according to this structure, a portion of a magnetic stripe recorded with the preamble or its portion recorded with the postamble can be contacted with the magnetic head. Accordingly, an output signal of the magnetic head can be stabilized regardless of the content of magnetic data recorded in the magnetic stripe and, as a result, it can be further appropriately detected that magnetic data are recorded in the card. Further, according to this structure, even when the magnetic stripe is scratched due to inclination of the magnetic head, occurrence of a scratch on the center portion of the magnetic stripe where important card data are recorded can be prevented.

In at least an embodiment of the present invention, it is preferable that the card insertion part includes a metal detection mechanism having an excitation coil and a detection coil for detecting an external connection terminal of an IC chip formed on the card, and the metal detection mechanism is disposed on the other end side in the first direction of the card insertion part. According to this structure, even when the card reader includes a metal detection mechanism, the magnetic head is hard to be affected by a magnetic field generated by the excitation coil of the metal detection mechanism. Therefore, even when the metal detection mechanism is disposed in the card insertion part, it can be appropriately detected that a card on which magnetic data are recorded has been inserted in a state that the directions of its front and rear faces are correct based on a detected result by the magnetic head.

As described above, in at least an embodiment of the present invention, in a card reader for use with a card in a substantially rectangular shape which is taken into in its short side direction to be performed with reading of magnetic data recorded in the card, it can be detected that the card has been inserted in a state that the directions of its front and rear faces are correct.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

At least an embodiment of the present invention will be described below with reference to the accompanying drawings.

(Schematic Structure of Card Reader)

Figure 1:
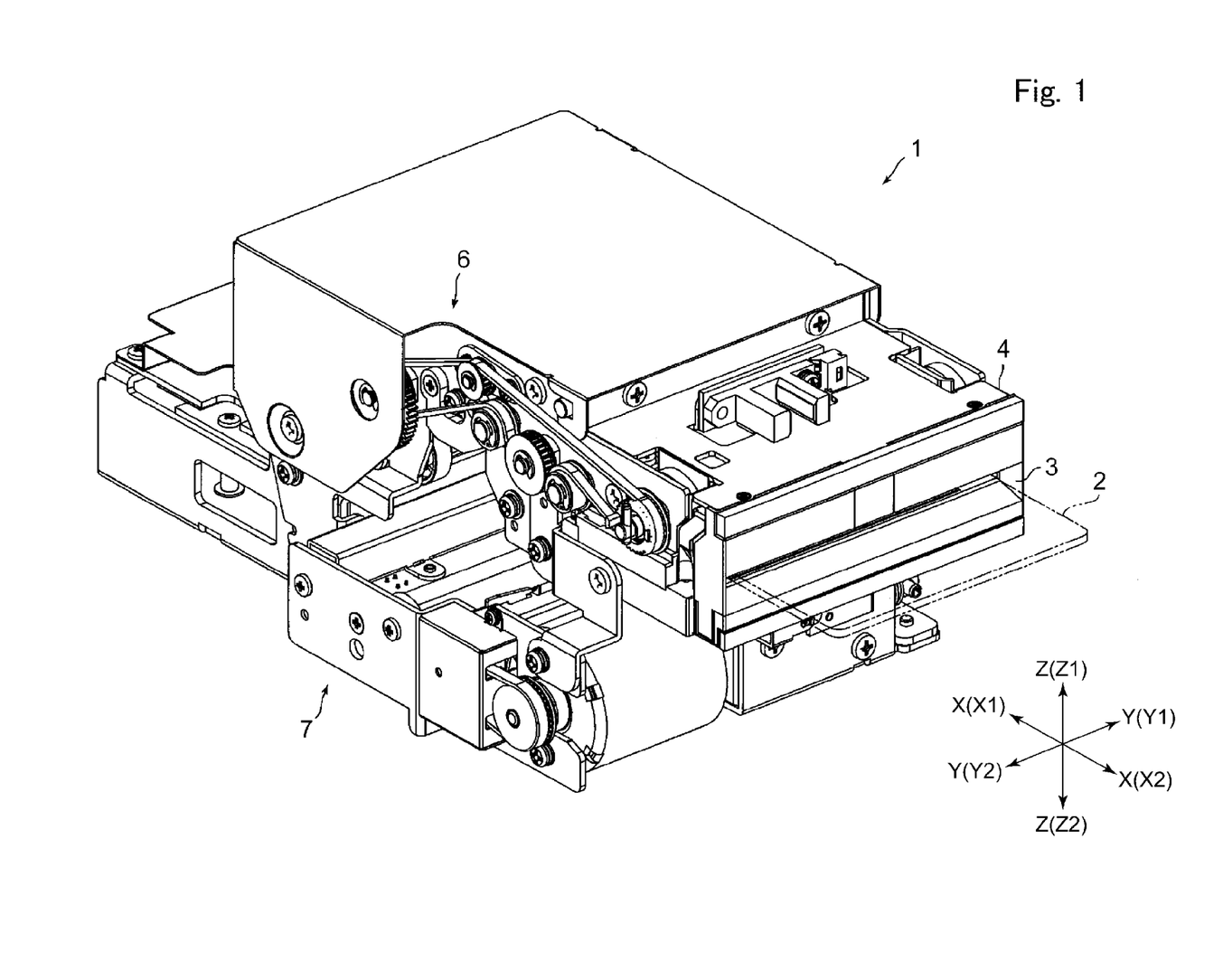
FIG. 1 is a perspective view showing a card reader in accordance with an embodiment of the present invention.

FIG. 1 is a perspective view showing a card reader 1 in accordance with an embodiment of the present invention. A card reader 1 in this embodiment is a device for performing reading of data recorded in a card 2 and recording of data to a card 2 and is mounted for use on a predetermined host device such as an ATM (Automated Teller Machine). The card reader 1 includes a card insertion part 4 formed with an insertion port 3 into which a card 2 is inserted. Further, an inside of the card reader 1 is formed with a card passage 5 (see FIG. 2) where a card 2 inserted into the insertion port 3 is passed. The card passage 5 is formed so as to be connected with the insertion port 3. Further, the card reader 1 includes a card conveying mechanism 6 structured to convey a card 2 in the card passage 5.

The card 2 is a card made of vinyl chloride and its thickness is about 0.7-0.8 mm. The card 2 in this embodiment is a contact type IC card with a magnetic stripe in conformity with the international standard (for example, ISO/IEC 7811) or JIS standard (for example, JISX 6302) and is formed in a substantially rectangular shape whose four corners are rounded. A rear face 2b of the card 2 is formed with a magnetic stripe 2a in which magnetic data are recorded. The card 2 is incorporated with an IC chip not shown and a front face 2b of the card 2 is formed with a terminal part 2c comprised of eight external connection terminals.

The magnetic stripe 2a is formed in a long and thin strip shape which is parallel to a longitudinal direction of a card 2 formed in a substantially rectangular shape. In other words, the magnetic stripe 2a is formed so that its longitudinal direction and a longitudinal direction of a card 2 are coincided with each other. The magnetic stripe 2a is formed over the entire region in the longitudinal direction of the card 2. Further, the magnetic stripe 2a is formed on one end 2d side in a short side direction of the card 2. Specifically, the magnetic stripe 2a is formed in a predetermined range with the one end 2d in the short side direction of the card 2 as a reference based on the international standard or JIS standard. A terminal part 2c is formed at a predetermined position with the one end 2d of the card 2 and the one end 2e in a longitudinal direction of the card 2 as references. Further, the terminal part 2c is formed on one end 2e side of the card 2 in the longitudinal direction of the card 2.

Magnetic data recorded in the magnetic stripe 2a are arranged in a longitudinal direction of the magnetic stripe 2a (in other words, a longitudinal direction of the card 2). In other words, in the longitudinal direction of the magnetic stripe 2a, magnetic poles of an "N"-pole and an "S"-pole are reversed at predetermined pitches depending on recorded magnetic data. Further, the magnetic stripe 2a is recorded with magnetic data of three tracks, i.e., a first track, a second track and a third track. Recording density of magnetic data recorded in the first track and the third track is 210 bpi and recording density of magnetic data recorded in the second track is 75 bpi. Further, one end side of the magnetic stripe 2a is recorded with a preamble comprised of magnetic data of all "0" and the other end side of the magnetic stripe is recorded with a postamble comprised of magnetic data of all "0". Specifically, the preamble is recorded on the one end 2e side in the longitudinal direction of a card 2 and the postamble is recorded on the other end 2f side in the longitudinal direction of the card 2.

In this embodiment, a card 2 is conveyed in an "X" direction shown in FIG. 1. Specifically, a card 2 is inserted and taken into in an "X1" direction and the card 2 is ejected in an "X2" direction. In other words, the "X" direction is a conveying direction of a card 2, the "X1" direction is an inserting direction of the card 2, and the "X2" direction is an ejecting direction of the card 2. Further, in this embodiment, a card 2 is inserted into the card reader 1 so that the short side direction of the card 2 is coincided with the "X" direction and the card 2 is conveyed in an inside of the card reader 1 so that the short side direction of the card 2 is coincided with the "X" direction. In other words, the card reader 1 takes a card 2 into in the short side direction of the card 2 and a predetermined processing such as reading of magnetic data recorded in the card 2 is performed.

A "Y" direction perpendicular to the "X" direction is a width direction of a card 2 inserted into the insertion port 3 and is a longitudinal direction of the card 2 inserted into an inside of the card reader 1 in a correct posture. Further, a "Z" direction in FIG. 1 perpendicular to the "X" direction and the "Y" direction is a thickness direction of a card 2 which is inserted into the insertion port 3. In this embodiment, the card reader 1 is disposed so that the "Z" direction and a vertical direction are coincided with each other. In the following descriptions, the "X" direction is referred to as a "front and rear direction", the "Y" direction is referred to as a "right and left direction", and the "Z" direction is as an "upper and lower direction". Further, an "X1" direction side is referred to as a "rear (back)" side, an "X2" direction side is as a "front" side, a "Y1" direction side is as a "right" side, a "Y2" direction side is as a "left" side, a "Z1" direction side is as an "upper" side, and a "Z2" direction side is as a "lower" side. The right and left direction ("Y" direction) in this embodiment is a first direction perpendicular to the rear direction ("X1" direction) which is an inserting direction of a card 2 when viewed in the upper and lower direction ("Z" direction) that is a thickness direction of a card 2 inserted into the insertion port 3.

The card reader 1 includes, in addition to the above-mentioned structures, a magnetic head (not shown) structured to abut with a card 2 to perform reading of magnetic data recorded on the card 2 and recording magnetic data on the card 2, a head moving mechanism 7 structured to move the magnetic head in the right and left direction perpendicular to the conveying direction of the card 2, an IC contact block (not shown) structured to contact with the terminal part 2c of the card 2 to perform data communication, a contact block moving mechanism (not shown) structured to move the IC contact block, and a positioning mechanism (not shown) for positioning the card 2 having been taken into the inside of the card reader 1.

The head moving mechanism 7 includes a carriage on which the magnetic head is mounted, a guide shaft for guiding the carriage in the right and left direction, a lead screw structured to feed the carriage in the right and left direction, a cam plate for moving the magnetic head up and down, a turning prevention shaft for preventing turning of the carriage with the guide shaft as a center, and the like. The head moving mechanism 7 moves the magnetic head in the right and left direction and moves the magnetic head up and down between a position where the magnetic head is capable of abutting with a magnetic stripe 2a of a card 2 and a position where the magnetic head is retreated from the card passage 5. The head moving mechanism 7 in this embodiment moves the magnetic head so as to retreat to a lower side of the card passage 5.

The IC contact block includes a plurality of IC contact springs structured to contact with a terminal part 2c of a card 2. The contact block moving mechanism moves the IC contact block between a position where the IC contact springs are capable of contacting with the terminal part 2c and a position where the IC contact springs are retreated from the card passage 5. The contact block moving mechanism in this embodiment moves the IC contact springs to retreat to an upper side of the card passage 5. The positioning mechanism includes a positioning member with which a rear end of a card 2 having been taken into an inside of the card reader 1 is abutted, and the like. The positioning mechanism positions a card 2 when the magnetic head and the IC contact block perform reading and recording of data.

(Structure of Card Insertion Part)

Figure 2:
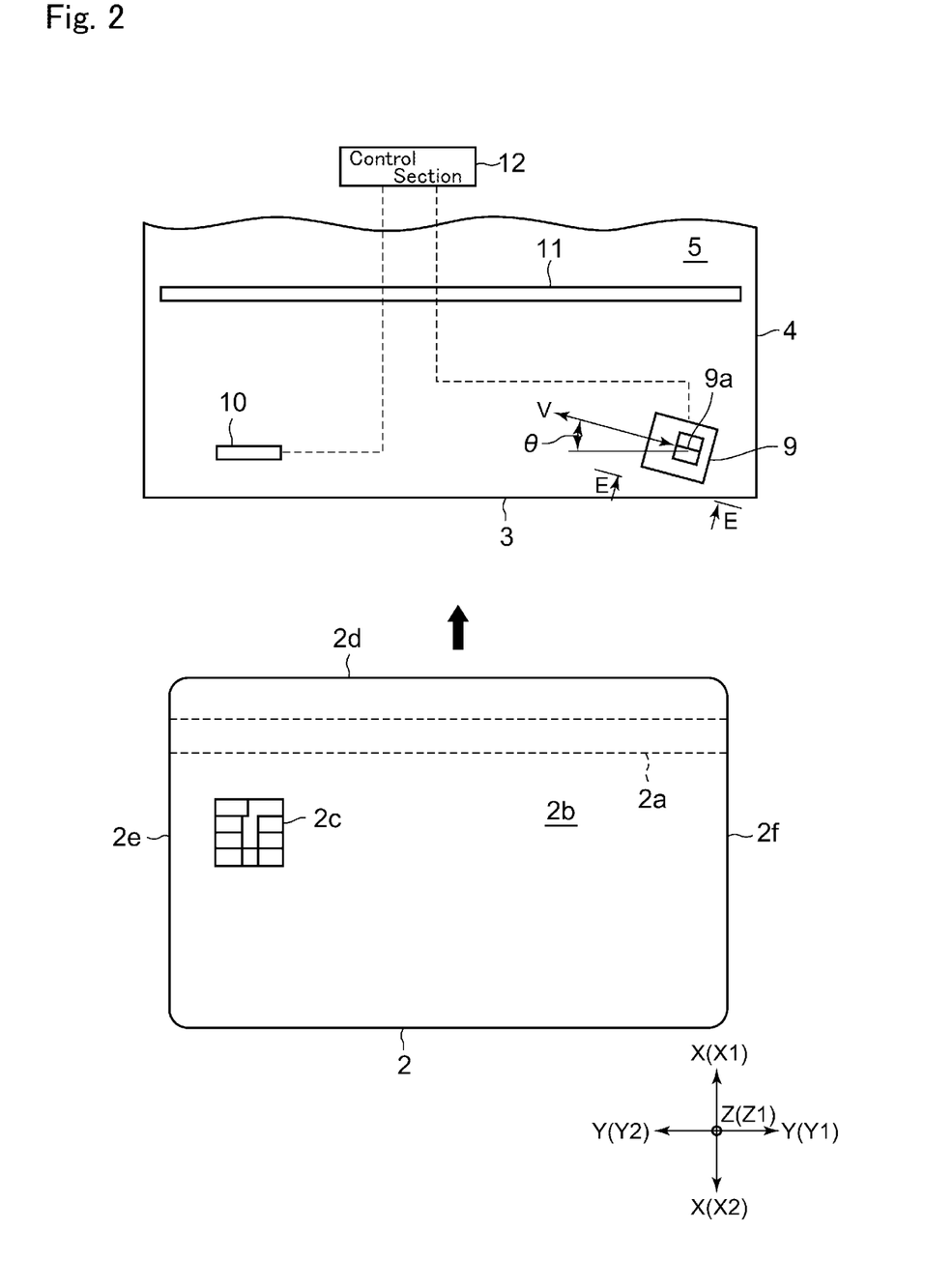
FIG. 2 is an explanatory view showing a schematic structure of a card insertion part shown in FIG. 1.
Figure 3A:
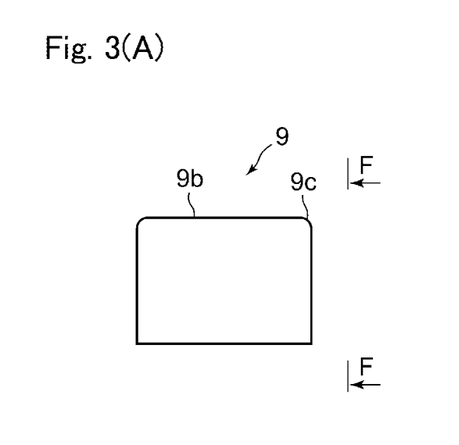
FIG. 3(A) is a front view showing a pre-head viewed in the "E-E" direction in FIG. 2
Figure 3B:
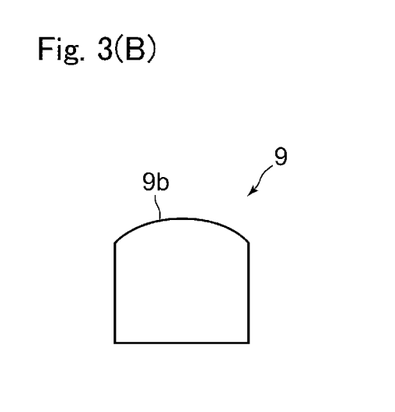
FIG. 3(B) is a side view showing the pre-head viewed in the "F-F" direction in FIG. 3(A).
Figure 4:
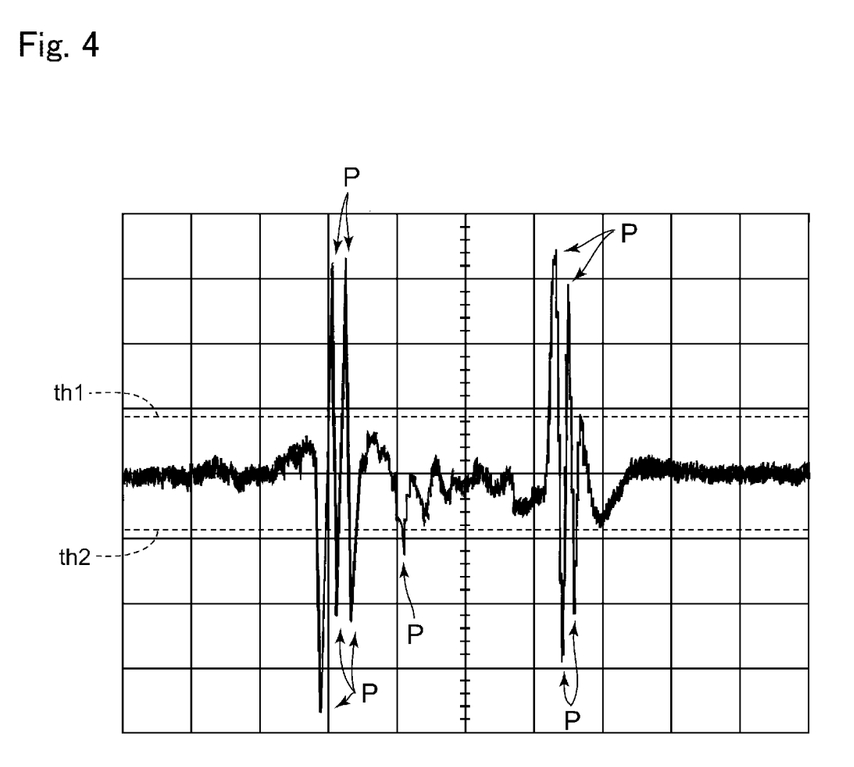
FIG. 4 is a view showing an example of an output signal of the pre-head shown in FIG. 2.
Figure 5:
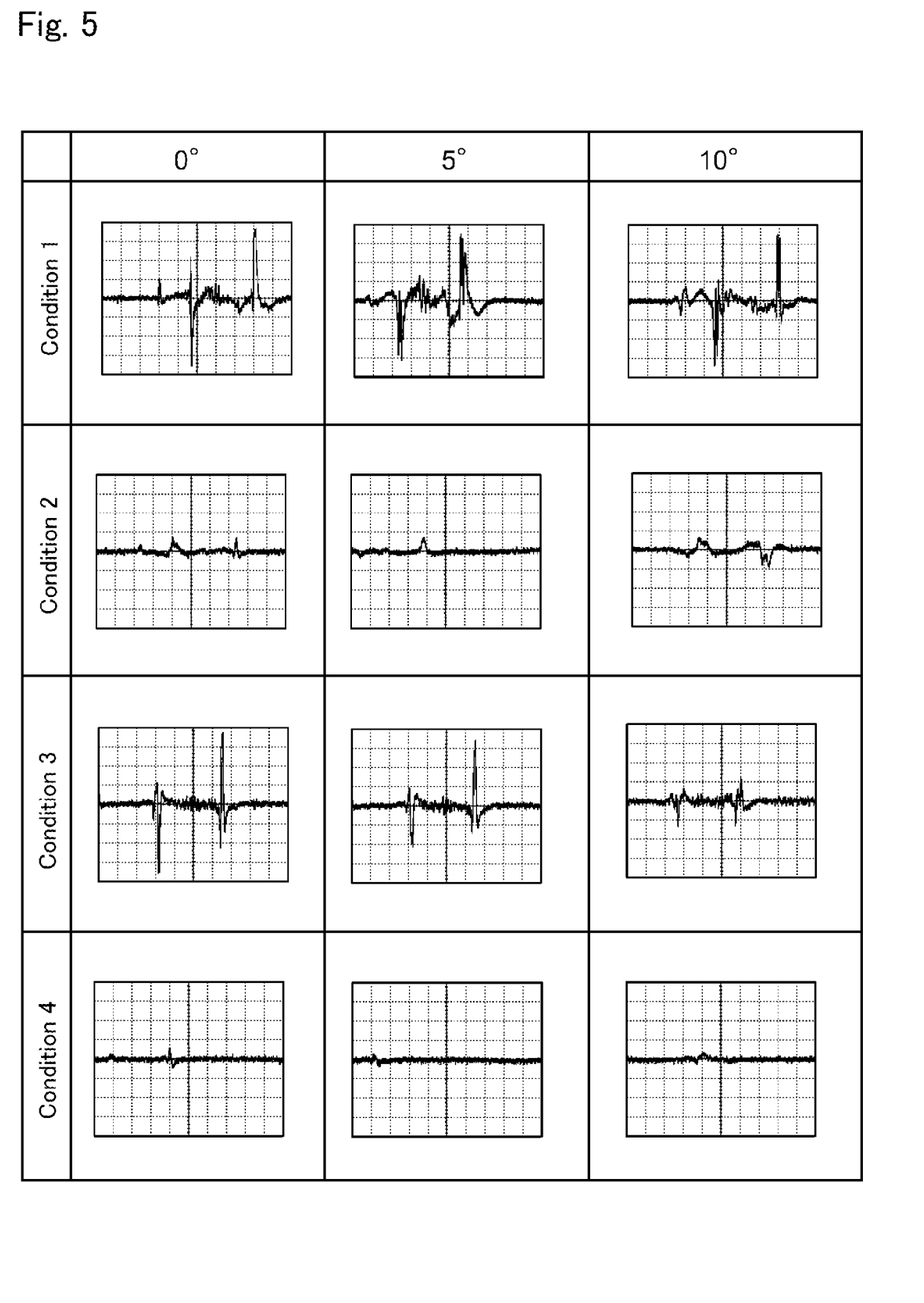
FIG. 5 shows data of measurement results of an output signal of the pre-head when an inclination angle of a gap direction shown in FIG. 2 is set at angles of 0°, 5° and 10°.
Figure 6:
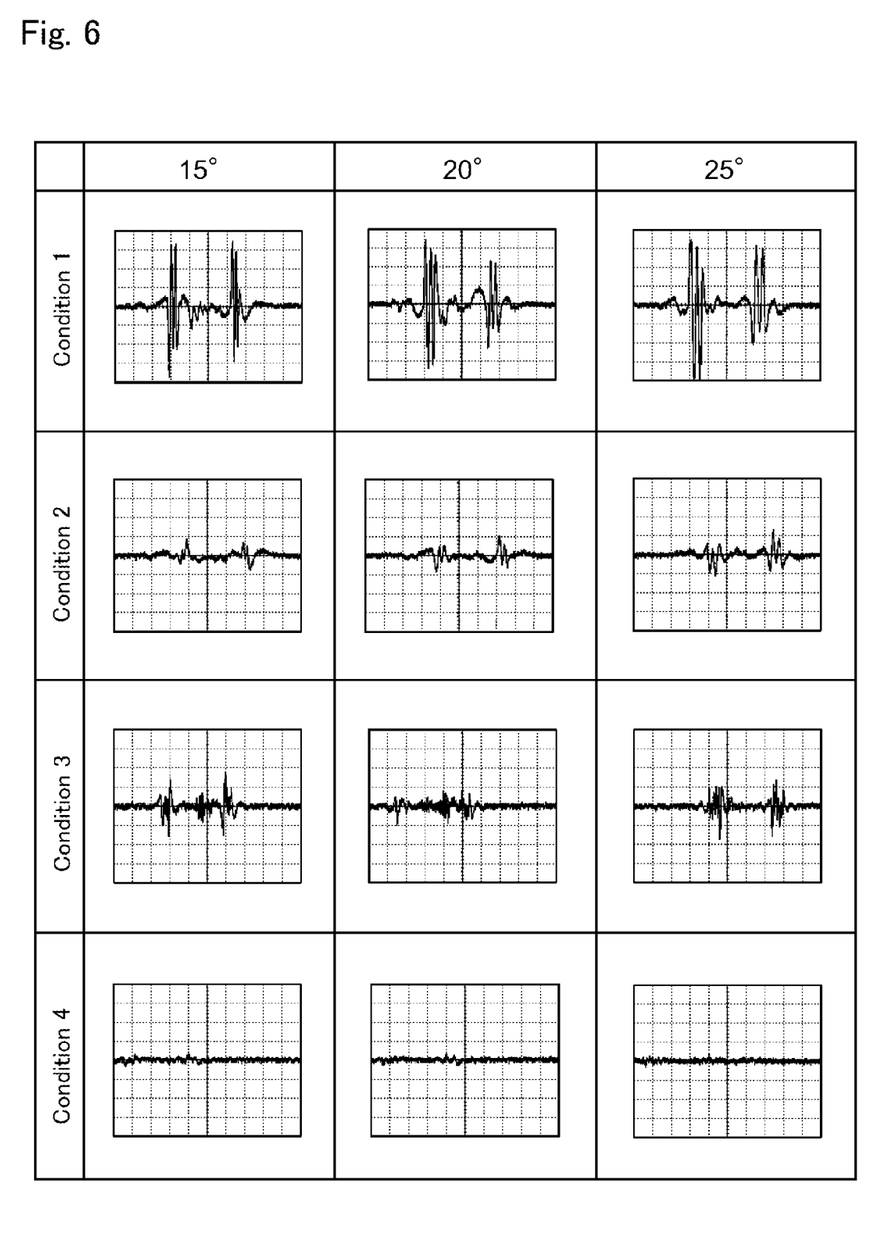
FIG. 6 shows data of measurement results of an output signal of the pre-head when the inclination angle of the gap direction shown in FIG. 2 is set at angles of 15°, 20° and 25°.
Figure 7:
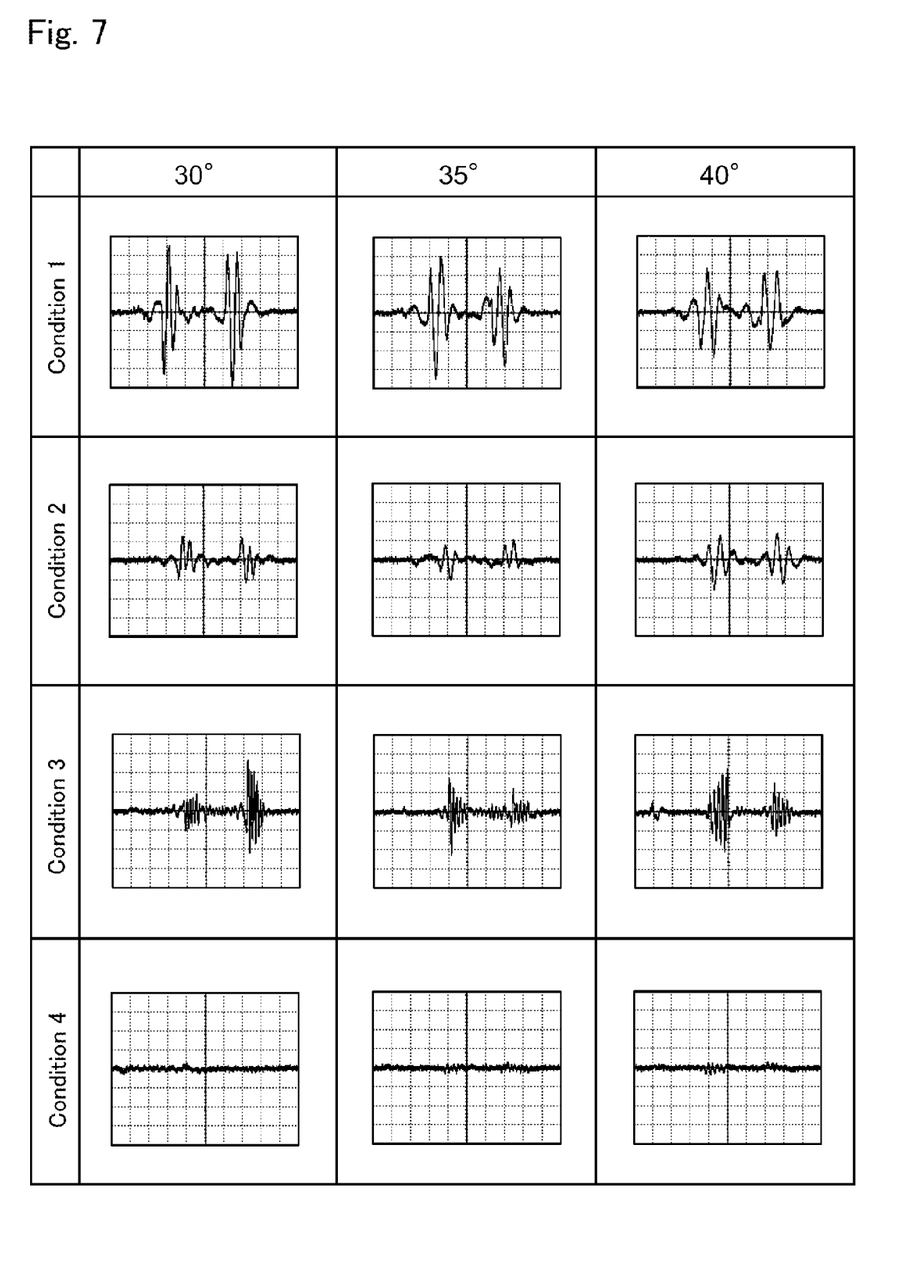
FIG. 7 shows data of measurement results of an output signal of the pre-head when the inclination angle of the gap direction shown in FIG. 2 is set at angles of 30°, 35° and 40°.
Figure 8:
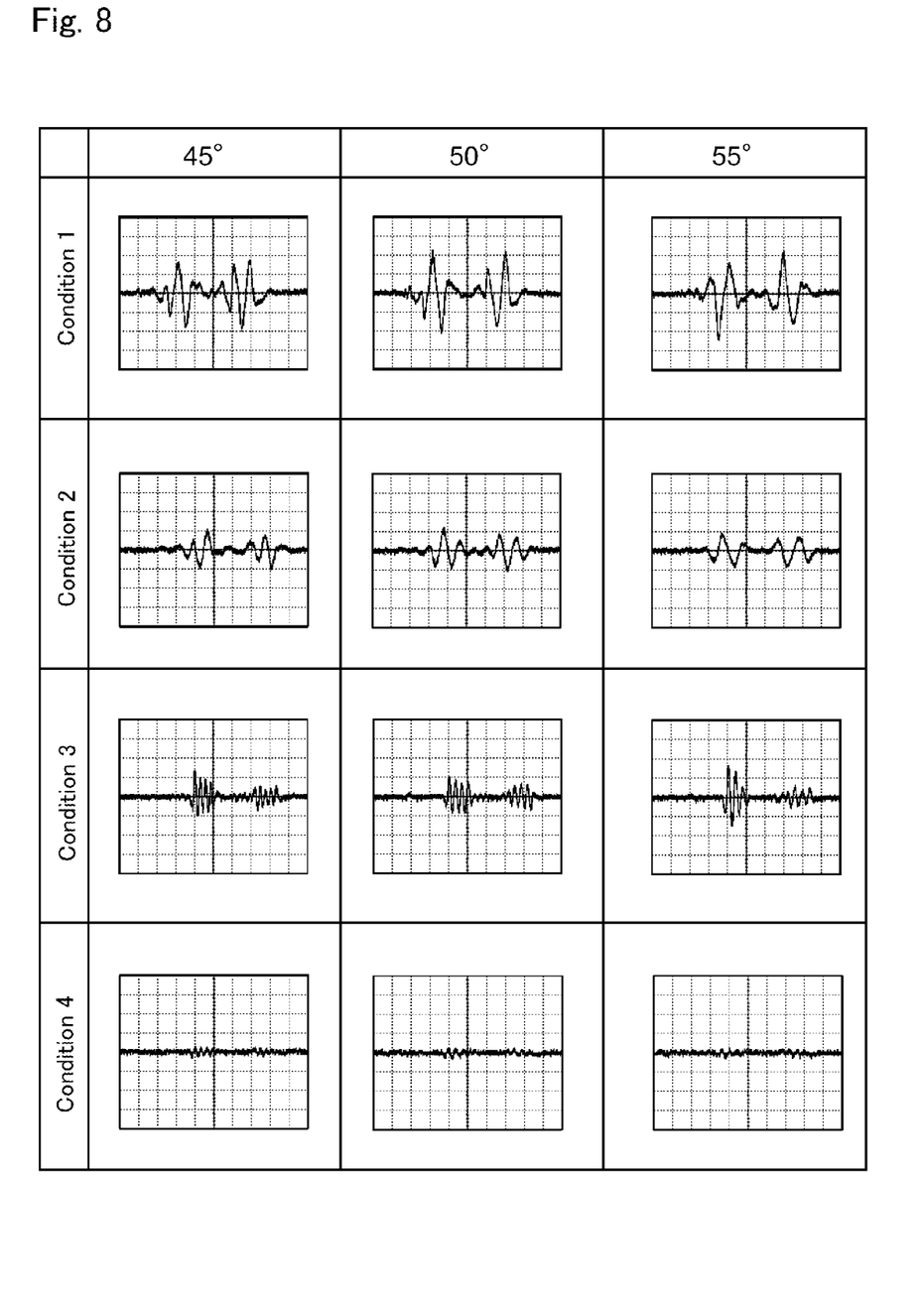
FIG. 8 shows data of measurement results of an output signal of the pre-head when the inclination angle of the gap direction shown in FIG. 2 is set at angles of 45°, 50° and 55°.
Figure 9:
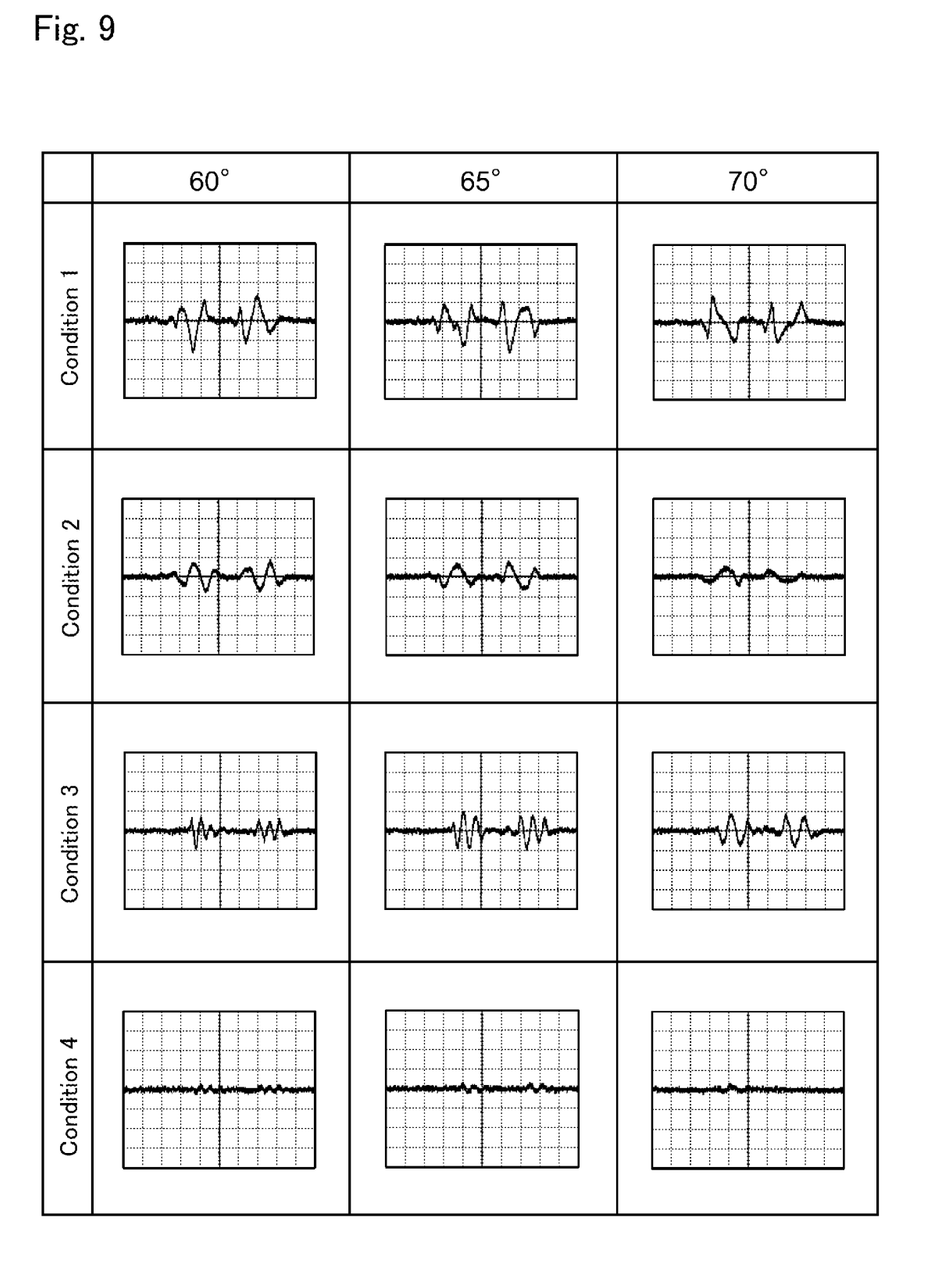
FIG. 9 shows data of measurement results of an output signal of the pre-head when the inclination angle of the gap direction shown in FIG. 2 is set at angles of 60°, 65° and 70°.
Figure 10:
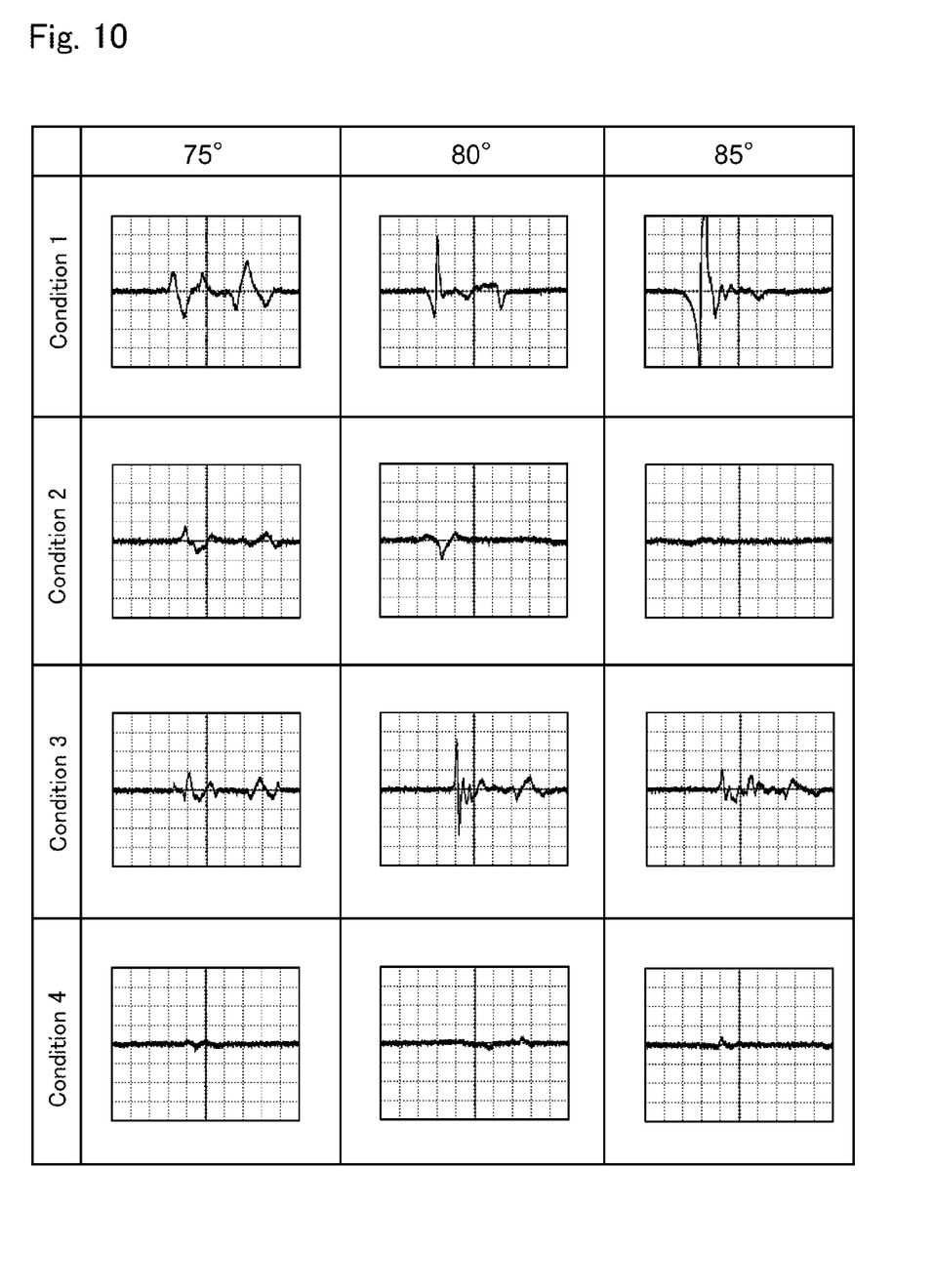
FIG. 10 shows data of measurement results of an output signal of the pre-head when the inclination angle of the gap direction shown in FIG. 2 is set at angles of 75°, 80° and 85°.
Figure 11:
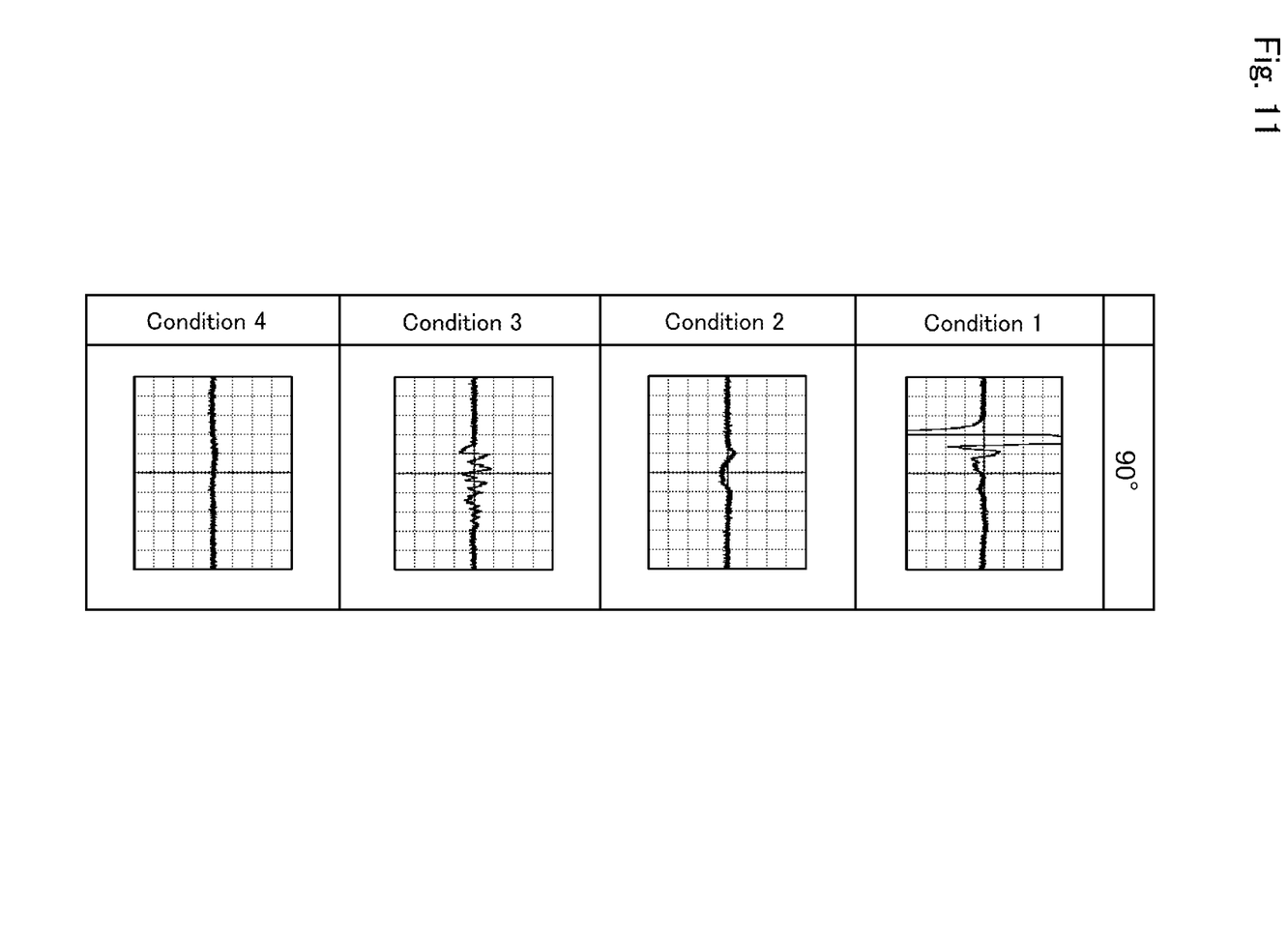
FIG. 11 shows data of measurement results of an output signal of the pre-head when the inclination angle of the gap direction shown in FIG. 2 is set at an angle of 90°.

FIG. 2 is an explanatory view showing a schematic structure of the card insertion part 4 shown in FIG. 1. FIG. 3(A) is a front view showing a pre-head 9 viewed in the "E-E" direction in FIG. 2 and FIG. 3(B) is a side view showing the pre-head 9 viewed in the "F-F" direction in FIG. 3(A). FIG. 4 is a view showing an example of an output signal of the pre-head 9 shown in FIG. 2.

The card insertion part 4 structures a front face side portion of the card reader 1. The card insertion part 4 includes a pre-head 9 as a magnetic head structured to contact with a card 2, a metal detection mechanism 10 for detecting a terminal part 2c of the card 2 (in other words, external connection terminals of an IC chip), a shutter member 11 structured to open and close the card passage 5, and a control section 12 into which an output signal of the pre-head 9 and an output signal of the metal detection mechanism 10 are inputted.

The metal detection mechanism 10 is a magnetic type sensor including an excitation coil, a detection coil, and a core which is formed of magnetic material and around which the excitation coil and the detection coil are wound. The metal detection mechanism 10 is disposed at a position in the right and left direction where the terminal part 2c of a card 2 inserted in a correct posture is passed (in other words, a card 2 inserted in a posture that magnetic data are capable of being read and recorded by the magnetic head and data are capable of being read and recorded by the IC contact block). Specifically, the metal detection mechanism 10 is disposed on a left end side of the card insertion part 4. Further, the metal detection mechanism 10 is disposed to an upper face side of the card passage 5.

In this embodiment, a case that a card 2 is inserted into the insertion port 3 from the one end 2d side in a short side direction of the card 2 in a state that its front face 2b is directed upward is a case that the card 2 is inserted in a correct posture. Further, the card insertion part 4 in this embodiment includes a width detection mechanism (not shown) for detecting both end parts in a width direction ("Y" direction) of a card 2 and, based on a detected result of the width detection mechanism, it is detected whether a card 2 has been inserted into the insertion port 3 or not so that a short side direction of the card 2 is coincided with the front and rear direction.

The shutter member 11 is disposed at a rear end of the card insertion part 4. The shutter member 11 is connected with a drive mechanism for the shutter member 11 having a solenoid and the like and the shutter member 11 is movable between a closing position where the shutter member 11 is located in the card passage 5 to close the card passage 5 and an open position where the shutter member 11 is retreated to a lower side of the card passage 5 to open the card passage 5.

A straight-shaped magnetic gap 9a is formed at a tip end of the pre-head 9 which is structured to contact with a card 2. In other words, in the tip end of the pre-head 9, a gap is formed in a core (not shown) disposed in an inside of the pre-head 9 and the gap is the magnetic gap 9a. In a case that a forming direction of the magnetic gap 9a formed in a straight shape (direction shown by the arrow "V" in FIG. 2) when viewed in the upper and lower direction is referred to as a gap direction, as shown in FIG. 3(B), the tip end part 9b of the pre-head 9 when viewed in the gap direction is, for example, formed in a convex curved surface shape. The pre-head 9 is disposed to an under face side of the card passage 5 so that the magnetic gap 9a faces the card passage 5 from a lower side. Further, the pre-head 9 is disposed on the right end side of the card insertion part 4. Specifically, the pre-head 9 is disposed at a position where a postamble recorded portion of a magnetic stripe 2a of a card 2 which is inserted in a correct posture is passed.

Further, the pre-head 9 is disposed so that the gap direction is inclined with respect to the right and left direction when viewed in the upper and lower direction. When viewed in the upper and lower direction, in a case that an inclination angle of the gap direction is set to be 0° when the right and left direction and the gap direction are parallel to each other, and that an inclination angle of the gap direction is set to be 90° when the right and left direction and the gap direction is perpendicular to each other, in this embodiment, an inclination angle "θ" (see FIG. 2) of the gap direction is set in a range of 10° to 75° when viewed in the upper and lower direction. Specifically, when viewed in the upper and lower direction, the inclination angle "θ" is set in a range of 15° to 25°. More specifically, the inclination angle "θ" in this embodiment is set to 15°.

The pre-head 9 is connected with the control section 12 and an output signal of the pre-head 9 is inputted into the control section 12. As described above, magnetic data recorded in the magnetic stripe 2a are arranged in a longitudinal direction of a card 2 and the card 2 is taken into the card reader 1 so that its short side direction and the front and rear direction are coincided with each other. Therefore, arrangement direction of magnetic data recorded on a card 2 which is taken into the card reader 1 is coincided with the right and left direction. In this case, when the gap direction is parallel to the right and left direction, magnetization reversals in the magnetic data cannot be detected by the pre-head 9 even when the magnetic stripe 2a in which magnetic data are recorded is passed through the pre-head 9 while contacting with the pre-head 9. However, in this embodiment, the gap direction is inclined with respect to the right and left direction and thus, in a case that magnetic data are recorded in a magnetic stripe 2a, magnetization reversals of the magnetic data can be detected by the pre-head 9 when the magnetic stripe 2a is passed through the pre-head 9 while contacting with the pre-head 9.

Therefore, the control section 12 in this embodiment determines whether magnetic data are recorded in a magnetic stripe 2a or not based on an output signal of the pre-head 9. Specifically, in a case that magnetic data are recorded in a magnetic stripe 2a, a level of an output signal of the pre-head 9 varies plural times when the magnetic stripe 2a of a card 2 is passed and a peak value exceeding a predetermined threshold value appears predetermined times in the output signal. Therefore, the control section 12 determines that magnetic data are recorded in the magnetic stripe 2a when the number of peak values exceeding the predetermined threshold value becomes a predetermined number or more in the output signal of the pre-head 9 when the magnetic stripe 2a is passed through the pre-head 9. More specifically, when "n" is an integer of 3 or more, the control section 12 determines that magnetic data are recorded in the magnetic stripe 2a when the number of peak values exceeding a threshold value becomes "n" or more. For example, the control section 12 determines that magnetic data are recorded in the magnetic stripe 2a when the number of peak values exceeding a threshold value is five or more.

In other words, in a case that magnetic data are recorded in a magnetic stripe 2a, for example, an output signal of the pre-head 9 which varies in an analog shape as shown in FIG. 4 is inputted into the control section 12. The control section 12 counts the number of peak values "P" exceeding threshold values "th1" and "th2" (specifically, a peak value "P" exceeding the threshold value "th1" set on the plus side and a peak value "P" lower than the threshold value "th2" set on the minus side) as shown in FIG. 4. When the number of the peak values "P" is five or more, it is determined that magnetic data are recorded in the magnetic stripe 2a and, when the number of the peak values "P" is less than five, it is determined that magnetic data are not recorded in the magnetic stripe 2a.

The threshold values "th1" and "th2" in this embodiment are set so that a level of noise included in an output signal of the pre-head 9 does not exceed the threshold values "th1" and "th2". However, the threshold values "th1" and "th2" may be set, for example, to a value of substantially half of peak values in an output signal of the pre-head 9 when the pre-head 9 is contacted with the magnetic stripe 2a in a state that the inclination angle "θ" of the gap direction is 15°. Alternatively, the threshold values "th1" and "th2" may be set on the basis of an average value of noises which is previously calculated by using experiment results or the like.

(Inclination Angle of Gap Direction)

Figure 12:
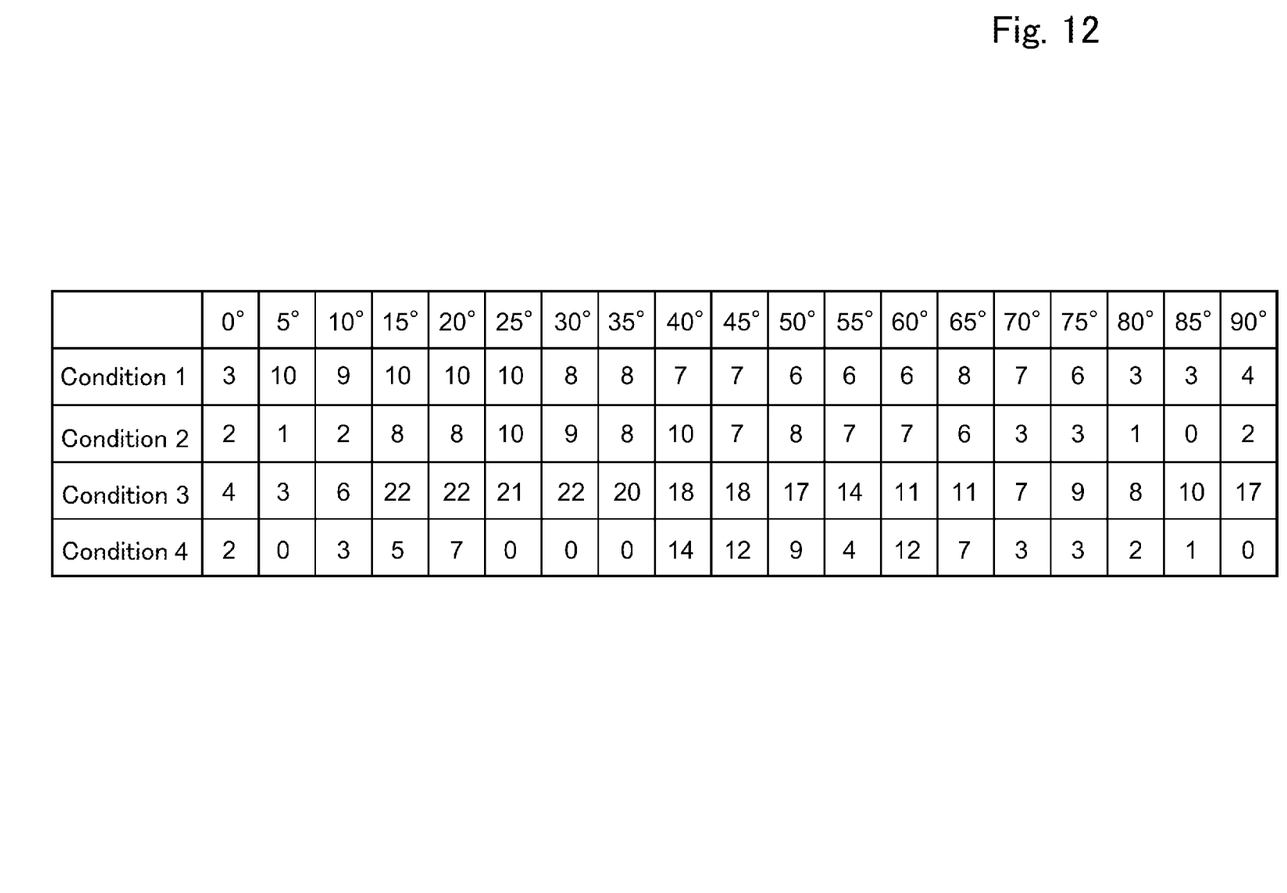
FIG. 12 is a table showing the number of peak values exceeding a predetermined threshold value in an output signal of the pre-head shown in FIG. 5 through FIG. 11.

FIGS. 5 through 11 show data of measurement results of an output signal of the pre-head 9 when the inclination angle "θ" of the gap direction shown in FIG. 2 is changed from 0° to 90° for every 5°. FIG. 12 is a table showing the number of peak values exceeding a predetermined threshold value in output signals of the pre-head 9 shown in FIGS. 5 through 11.

As described above, in this embodiment, an inclination angle "θ" of the gap direction is set in a range of 10° to 75° when viewed in the upper and lower direction. Specifically, when viewed in the upper and lower direction, the inclination angle "θ" is set in a range of 15° to 25° and, more specifically, the inclination angle "θ" is set to 15°. Setting reason of the inclination angle "θ" will be described below.

When an output signal of the pre-head 9 is measured while changing the inclination angle "θ" from 0° to 90° for every 5°, data shown in FIGS. 5 through 11 are obtained. In FIGS. 5 through 11, the output signal of the pre-head 9 shown in the "condition 1" is an output signal of the pre-head 9 which is measured under a condition that magnetic data whose recording density is 75 bpi are recorded in a magnetic stripe 2a and the magnetic stripe 2a is contacted with the pre-head 9. The output signal of the pre-head 9 shown in the "condition 2" is an output signal of the pre-head 9 which is measured under a condition that magnetic data whose recording density is 75 bpi are recorded in a magnetic stripe 2a and a gap of 40 μm is existed between the pre-head 9 and the magnetic stripe 2a. The output signal of the pre-head 9 shown in the "condition 3" is an output signal of the pre-head 9 which is measured under a condition that magnetic data whose recording density is 210 bpi are recorded in a magnetic stripe 2a and the magnetic stripe 2a is contacted with the pre-head 9. The output signal of the pre-head 9 shown in the "condition 4" is an output signal of the pre-head 9 which is measured under a condition that magnetic data whose recording density is 210 bpi are recorded in a magnetic stripe 2a and a gap of 40 μm is existed between the pre-head 9 and the magnetic stripe 2a. In this embodiment, as described above, the pre-head 9 is disposed at a position where a postamble recorded portion of a magnetic stripe 2a is passed and, in all of the conditions 1 through 4, a portion of the magnetic stripe 2a where magnetic data of all "0" are recorded is passed through the pre-head 9.

In the output signals of the pre-head 9 shown in FIGS. 5 through 11, the numbers of peak values exceeding a predetermined threshold value are shown in the table in FIG. 12. According to the examinations of the present inventors, they have found that, in a case that a magnetic stripe 2a passing through the pre-head 9 is contacted with the pre-head 9, even if magnetic data are not recorded in a magnetic stripe 2a, a peak value of an output signal of the pre-head 9 may exceed a predetermined threshold value when the pre-head 9 starts to contact with the magnetic stripe 2a and when the contact of the pre-head 9 with the magnetic stripe 2a is ended. In other words, the present inventors have found that, even if magnetic data are not recorded in a magnetic stripe 2a, in a case that the magnetic stripe 2a passing through the pre-head 9 is contacted with the pre-head 9, there may be occurred that a peak value of an output signal of the pre-head 9 exceeds the threshold value two times. Therefore, in order to appropriately determine that magnetic data are recorded in a magnetic stripe 2a on the assumption that the magnetic stripe 2a is contacted with the pre-head 9, it is preferable that the inclination angle "θ" is set so that the number of peak values exceeding a threshold value in an output signal of the pre-head 9 measured under the condition 1 and in an output signal of the pre-head 9 measured under the condition 3 is larger than at least three (3). Therefore, in this embodiment, the inclination angle "θ" is set in a range from 10° to 75°.

Further, in an output signal of the pre-head 9 measured under the condition 1 and, in an output signal of the pre-head 9 measured under the condition 3, the inclination angle "θ" is further preferable at which the number of peak values exceeding a threshold value is larger. Further, as the inclination angle "θ" becomes larger, when a corner part 9c in the gap direction of a tip end part 9b of the pre-head 9 (see FIG. 3(A)) is to be contacted with a magnetic stripe 2a, a scratch may easily occur on the magnetic stripe 2a. In other words, most pre-heads 9 slide on a magnetic stripe 2a in a direction perpendicular to the gap direction and thus the pre-head 9 is formed in a convex curved surface shape so that the magnetic gap 9a is located at a vertex position in a direction perpendicular to the gap direction. On the other hand, there are few pre-heads 9 manufactured so as to slide on a magnetic stripe 2a along the gap direction and thus, when the inclination angle "θ" becomes larger, the corner part 9c which is not formed for sliding is contacted with the magnetic stripe 2a to easily occur a scratch on the magnetic stripe 2a. Therefore, in this embodiment, a relatively small angular range of 15° to 25° is set as a specific inclination angle "θ" in which the number of peak values exceeding a threshold value in the output signal of the pre-head 9 measured under the condition 1 and the output signal of the pre-head 9 measured under the condition 3 is relatively large. In addition, in this embodiment, the further specific inclination angle "θ" is set to 15° which is the smallest in the range of 15° to 25°.

(Principal Effects in this Embodiment)

As described above, in this embodiment, the pre-head 9 structured to contact with a card 2 is disposed in the card insertion part 4. Therefore, according to this embodiment, based on a detected result by the pre-head 9, it can be detected whether a card 2 formed with a magnetic stripe 2a has been inserted into the insertion port 3 in a state that a rear face of the card 2 is directed to a lower side or the card 2 has been inserted into the insertion port 3 in a state that the rear face of the card 2 is directed to an upper side. In other words, in this embodiment, it can be detected that a card 2 has been inserted in a state that the directions of the front and rear faces are correct based on a detected result by the pre-head 9.

In this embodiment, the gap direction of the pre-head 9 is inclined with respect to the right and left direction. Therefore, as described above, in a case that magnetic data are recorded in a magnetic stripe 2a, magnetization reversals of the magnetic data can be detected by the pre-head 9 when the magnetic stripe 2a is passed through the pre-head 9 while contacting with the pre-head 9. In other words, in this embodiment, it can be detected that a card 2 recorded with magnetic data has been inserted on the basis of a detected result by the pre-head 9.

As described above, even if magnetic data are not recorded in a magnetic stripe 2a, in a case that the magnetic stripe 2a is contacted with the pre-head 9, there may be occurred that a peak value of an output signal of the pre-head 9 exceeds the threshold value two times. However, according to this embodiment, the control section 12 determines that magnetic data are recorded in a magnetic stripe 2a when the number of peak values exceeding a threshold value is "n" or more ("n" is an integer of 3 or more). Therefore, it can be appropriately determined that magnetic data are recorded in the magnetic stripe 2a.

In this embodiment, the inclination angle "θ" of the gap direction is set in a range of 10° to 75°. Therefore, according to this embodiment, when magnetic data of 75 bpi or magnetic data of 210 bpi are recorded in a magnetic stripe 2a, as described above, the number of peak values exceeding a threshold value in an output signal of the pre-head 9 becomes larger than at least three (3). Accordingly, in this embodiment, it can be appropriately determined that magnetic data are recorded in a card 2 specified in the international standard or JIS standard.

In this embodiment, the inclination angle "θ" of the gap direction is set in a range of 15° to 25°. Therefore, as described above, in a case that magnetic data of 75 bpi or magnetic data of 210 bpi are recorded in a magnetic stripe 2a, the number of peak values exceeding the threshold value can be increased in the output signal of the pre-head 9 and occurrence of a scratch on the magnetic stripe 2a due to inclination of the pre-head 9 can be suppressed. Accordingly, in this embodiment, it can be appropriately determined that magnetic data are recorded in a card 2 specified in the international standard or JIS standard while suppressing occurrence of a scratch on the magnetic stripe 2a.

In this embodiment, the pre-head 9 is disposed at a position where a postamble recorded portion of the magnetic stripe 2a of a card 2 inserted in a correct posture is passed. Therefore, according to this embodiment, an output signal of the pre-head 9 can be stabilized regardless of the content of magnetic data recorded in the magnetic stripe 2a. Accordingly, in this embodiment, it can be further appropriately detected that magnetic data are recorded in the magnetic stripe 2a. Further, in this embodiment, the pre-head 9 does not contact with a center portion of the magnetic stripe 2a where important card data are recorded and thus, even when the magnetic stripe 2a is scratched due to inclination of the pre-head 9, occurrence of a scratch on the center portion of the magnetic stripe 2a is prevented.

In this embodiment, the metal detection mechanism 10 is disposed on the left end side of the card insertion part 4 and the pre-head 9 is disposed on the right end side of the card insertion part 4. Therefore, according to this embodiment, the pre-head 9 is hard to be affected by the magnetic field generated by an excitation coil of the metal detection mechanism 10. Accordingly, in this embodiment, even when the metal detection mechanism 10 is disposed in the card insertion part 4, it can be appropriately detected that a card 2 on which magnetic data are recorded has been inserted in a state that the directions of its front and rear faces are correct based on a detected result by the pre-head 9.

(Other Embodiments)

Although the present invention has been shown and described with reference to a specific embodiment, various changes and modifications will be apparent to those skilled in the art from the teachings herein.

In the embodiment described above, the pre-head 9 is disposed on the right end side of the card insertion part 4. However, the present invention is not limited to this embodiment. For example, in a case that the pre-head 9 is not affected by the magnetic field generated from an excitation coil of the metal detection mechanism 10 or, in a case that the metal detection mechanism 10 is not disposed in the card insertion part 4, the pre-head 9 may be disposed on the left end side of the card insertion part 4 or may be disposed in the center in the right and left direction of the card insertion part 4. However, in this case, it is preferable that the pre-head 9 is disposed at the position where a preamble recorded portion of the magnetic stripe 2a of a card 2 inserted in a correct posture is passed.

In the embodiment described above, the card 2 is a rectangular card made of vinyl chloride whose thickness is about 0.7-0.8 mm. However, the present invention is not limited to this embodiment. For example, the card 2 may be a PET (polyethylene terephthalate) card whose thickness is about 0.18-0.36 mm and may be a paper card having a predetermined thickness. Further, in the embodiment described above, a magnetic stripe 2a is formed on a rear face of a card 2 but, instead of the rear face of the card 2, a magnetic stripe may be formed on a front face 2b of a card 2. For example, a magnetic stripe in conformity with the standard of JISX6302 may be formed on a front face 2b of a card 2. In this case, the pre-head 9 is disposed to an upper face side of the card passage 5 so that its magnetic gap 9a faces the card passage 5 from an upper side.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card in a substantially rectangular shape, the card being taken into in its short side direction to be performed with reading of magnetic data recorded in a magnetic stripe of the card, wherein the magnetic stripe is formed so that its longitudinal direction and a longitudinal direction of the card are coincident with each other such that the magnetic data is arranged in the longitudinal direction of the card, the card reader comprising:
    a card insertion part formed with an insertion port into which the card is inserted; and
    a magnetic head provided in the card insertion part and structured to contact with the card;
    wherein a magnetic gap in a straight shape is formed at a tip end of the magnetic head where the card is to be contacted; and
    wherein when a forming direction of the magnetic gap formed in the straight shape is a gap direction, the gap direction is inclined with respect to a first direction perpendicular to an inserting direction of the card when viewed in a thickness direction of the card inserted into the insertion port.

2. The card reader according to claim 1, further comprising a control section into which an output signal of the magnetic head is inputted,
    wherein the control section is structured to determine that the magnetic data are recorded in the magnetic stripe when a number of peak values exceeding a predetermined threshold value is a predetermined number or more, the peak values being values of peaks included in the output signal of the magnetic head when the card is passed through the magnetic head.

3. The card reader according to claim 2, wherein the control section is structured to determine that the magnetic data are recorded in the magnetic stripe when the number of the peak values exceeding the threshold value is "n" or more, wherein the "n" is an integer of 3 or more.

4. The card reader according to claim 3, wherein an inclination angle of the gap direction when viewed in the thickness direction of the card is set in a range of 10° to 75°, wherein the inclination angle of the gap direction is 0° in a case that the first direction and the gap direction are parallel to each other and the inclination angle of the gap direction is 90° in a case that the first direction and the gap direction are perpendicular to each other when viewed in the thickness direction of the card.

5. The card reader according to claim 4, wherein the inclination angle of the gap direction is set in a range of 15° to 25° when viewed in the thickness direction of the card.

6. The card reader according to claim 5, wherein the inclination angle of the gap direction is set to 15° when viewed in the thickness direction of the card.

7. The card reader according to claim 1, wherein the magnetic head is disposed on one end side in the first direction of the card insertion part.

8. The card reader according to claim 7, wherein
    the card insertion part comprises a metal detection mechanism having an excitation coil and a detection coil for detecting an external connection terminal of an IC chip formed on the card, and
    the metal detection mechanism is disposed on the other end side in the first direction of the card insertion part.

* * * * *